United States Patent
Asanuma

(10) Patent No.: US 10,451,721 B2
(45) Date of Patent: Oct. 22, 2019

(54) RADAR DEVICE AND SIGNAL PROCESSING METHOD

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 194 days.

(21) Appl. No.: 15/494,857

(22) Filed: Apr. 24, 2017

(65) Prior Publication Data

US 2017/0356990 A1 Dec. 14, 2017

(30) Foreign Application Priority Data

Jun. 13, 2016 (JP) .................... 2016-117082

(51) Int. Cl.
| | |
|---|---|
| *G01S 13/34* | (2006.01) |
| *G01S 13/42* | (2006.01) |
| *G01S 7/35* | (2006.01) |
| *G01S 13/93* | (2006.01) |
| *G01S 13/00* | (2006.01) |

(52) U.S. Cl.
CPC .............. *G01S 13/34* (2013.01); *G01S 7/354* (2013.01); *G01S 13/345* (2013.01); *G01S 13/42* (2013.01); *G01S 13/931* (2013.01)

(58) Field of Classification Search
CPC .................................................. G01S 13/422
See application file for complete search history.

(56) References Cited

U.S. PATENT DOCUMENTS

| | | | | | |
|---|---|---|---|---|---|
| 5,805,104 | A | * | 9/1998 | Kunert ................. | G01S 13/345 342/109 |
| 5,905,458 | A | * | 5/1999 | Ashihara ............... | G01S 13/422 342/109 |
| 5,963,162 | A | * | 10/1999 | Mochizuki ............ | G01S 13/345 342/109 |
| 6,674,393 | B2 | * | 1/2004 | Kishida ................. | G01S 13/345 342/109 |
| 7,579,981 | B2 | * | 8/2009 | Kishida ................. | G01S 13/345 342/109 |
| 8,760,341 | B2 | * | 6/2014 | Nakagawa ............ | G01S 13/345 342/109 |

FOREIGN PATENT DOCUMENTS

| | | |
|---|---|---|
| JP | 2009-092429 A | 4/2009 |
| JP | 2014-115137 A | 6/2014 |

* cited by examiner

*Primary Examiner* — Bernarr E Gregory
(74) *Attorney, Agent, or Firm* — Oliff PLC

(57) ABSTRACT

There is provided a radar device. An extracting unit is configured to extract peak signals from a frequency difference between a transmission signal and a reception signal, in a first range of each of a first period and a second period. An estimating unit is configured to estimate a current peak signal on the basis of a previous peak signal extracted by the extracting unit. A first setting unit is configured to set the first range on the basis of the estimation result. A second setting unit is configured to set a second range different from the first range, if the peak signal is extracted in the first range of the second period and the peak signal cannot be extracted in the first range of the first period. A re-extracting unit is configured to extract the peak signal in the second range of the first period.

9 Claims, 5 Drawing Sheets

RADAR DEVICE AND SIGNAL PROCESSING METHOD

CROSS-REFERENCE TO RELATED APPLICATIONS

This application is based on and claims priority from Japanese Patent Application No. 2016-117082 filed on Jun. 13, 2016.

TECHNICAL FIELD

The present invention relates to a radar device and a signal processing method.

RELATED ART

There is, for example, a radar device for detecting the distances from a vehicle equipped with the radar device to targets, the relative velocities between the targets and the vehicle, and so on by transmitting a transmission wave from the vehicle and receiving reflected waves of the transmission wave from the targets.

When extracting peak signals from difference frequencies between the transmission wave and a reflected wave, the radar device estimates current peak signals (hereinafter, referred to as estimated peak signals) on the basis of peak signals detected in the previous process, and extracts peak signals in a predetermined frequency range based on the frequencies of the estimated peak signals. The peak signals extracted in the above-described way are peak signals (hereinafter, referred to as history peak signals) belonging to the same target as that of the peak signals of the previous process.

Further, in a case where there is no peak signal in the predetermined frequency range, the radar device widens the predetermined frequency range, and re-extracts history peak signals (see Patent Document 1).

Patent Document 1: Japanese Patent Application Publication No. 2014-115137A

However, in the case of performing the process of widening the predetermined frequency range and extracting peak signals, the radar device may erroneously extract a peak signal which is not a history peak signal, as a history peak signal. In this case where a peak signal which is not a history peak signal is erroneously extracted as a history peak signal, a target is detected at a location different from the actual location of the target. For this reason, in the case of widening the predetermined frequency range, it is required to extract history peak signals with high accuracy.

SUMMARY

It is therefore an object of the present invention to provide a radar device and a signal processing method capable of extracting history peak signals with high accuracy.

In order to solve the above-described problem and achieve the object, there is provided a radar device comprising: an extracting unit configured to extract peak signals from a frequency difference between a transmission signal in which a frequency varies in a predetermined cycle and a reception signal obtained by receiving a reflected wave of a transmission wave based on the transmission signal from a target, in a first range of each of a first period in which the frequency of the transmission signal increases and a second period in which the frequency decreases; an estimating unit configured to estimate a current peak signal on the basis of a previous peak signal extracted by the extracting unit; a first setting unit configured to set the first range on the basis of the estimation result of the estimating unit; a second setting unit configured to set a second range different from the first range, if the peak signal is extracted in the first range of the second period and the peak signal cannot be extracted in the first range of the first period; and a re-extracting unit configured to extract the peak signal in the second range of the first period, set by the second setting unit.

According to the present invention, it is possible to extract history peak signals with high accuracy.

BRIEF DESCRIPTION OF THE DRAWINGS

Exemplary embodiments of the present invention will be described in detailed based on the following figures, wherein.

DETAILED DESCRIPTION

Hereinafter, embodiments of a radar device and a signal processing method to be disclosed in this specification will be described in detail with reference to the accompanying drawings. However, the present invention is not limited by the following embodiments.

Figure 1A:
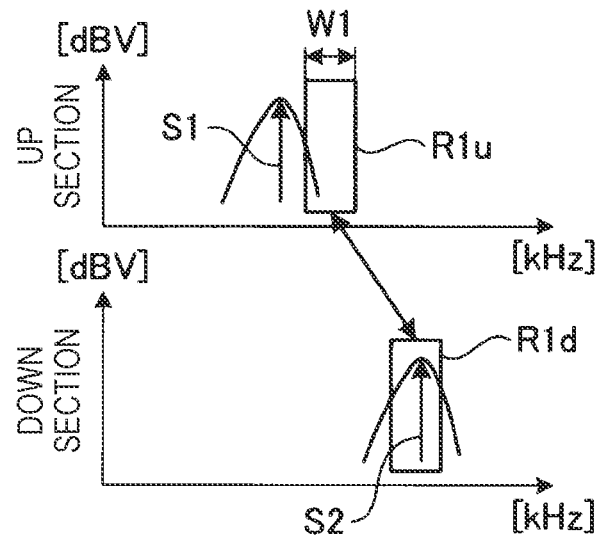
FIG. 1A is a view for explaining an overview of a signal processing method according to an embodiment of the present invention.
Figure 1B:
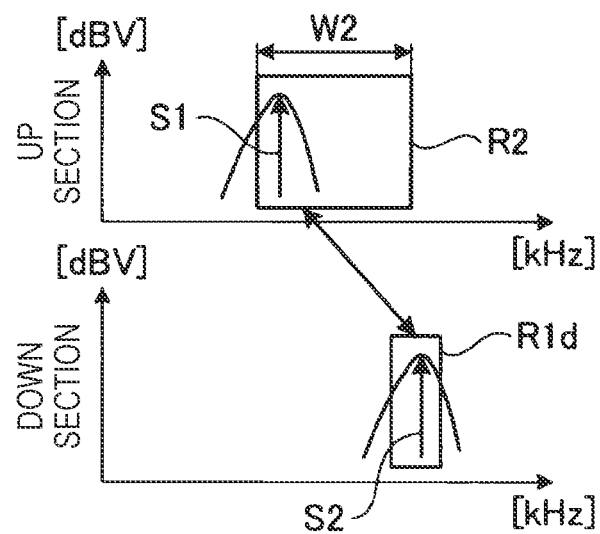
FIG. 1B is a view for explaining the overview of the signal processing method according to the embodiment of the present invention.

First, a signal processing method according to an embodiment will be described with reference to FIGS. 1A and 1B. FIGS. 1A and 1B are views for explaining an overview of the signal processing method according to the embodiment. Also, it is assumed that the signal processing method is performed by a radar device mounted on a vehicle C (not shown in the drawings).

Also, the radar device uses a so-called FMCW (frequency-modulated continuous-wave) system, and generates information on a target T on the basis of reflected waves. In this specification, a case where the target T is a preceding vehicle running in front of the own vehicle C will be described; however, the present invention is not limited thereto. For example, the target T may be a moving object such as a vehicle or a bicycle running behind the own vehicle C, or a pedestrian, or may be a still object such as a side stripe, a traffic light, a pole, or a guide rail.

Now, a peak signal extracting method of the related art will be described. According to the extracting method of the related art, a radar device transmits a transmission wave in which a frequency thereof changes in a predetermined cycle, and receives a reflected wave of the corresponding transmission wave from a target by receiving antennae.

Subsequently, the radar device mixes a transmission signal corresponding to the transmission wave and a reception signal corresponding to the reception wave, thereby generating beat signals. Specifically, the radar device generates beat signals based on frequency differences (beat frequencies) between the transmission signal and the reception signal, in the individual sections with a predetermined period included in a first period (hereinafter, referred to as an UP section) when the frequency increases in the predetermined cycle and a second period (hereinafter, referred to as a DOWN section) when the frequency decreases.

The radar device performs fast Fourier transform (FFT) on the beat signals, thereby generating frequency domain signals (hereinafter, referred to as frequency beat signals), and extracts peak signals from the corresponding frequency beat signals. The radar device pairs a peak signal of the UP section and a peak signal of the DOWN section on the basis of a predetermined condition, thereby deriving a pair of data items.

In this case, the radar device estimates current peak signals as estimated peak signals on the basis of pair data items derived in the past, and extracts peak signals from a first range R1 including the estimated peak signal and having a width W1. The following description will be made on the assumption that a peak signal S1 shown in FIG. 1A is a history peak signal of the UP section of one target and a peak signal S2 is a history peak signal of the DOWN section of the same target. Also, a first range R1 of the UP section will be referred to as the first range R1$u$, and a first range R1 of the DOWN section will be referred to as the first range R1$d$.

In this case, for example, if a driver of a preceding vehicle slams on the brakes, thereby suddenly decelerating the vehicle, according to the principle of detecting a target by the FMCW system (to be described below), as shown in FIG. 1A, the peak signal S2 of the DOWN section is included in the predetermined frequency range R1$d$, and thus is extracted; whereas the peak signal S1 of the UP section is out of the first range R1$u$, and thus is not extracted. As described above, according to the extracting method of the related art, it is impossible to extract the peak signal S1 of the UP section, and thus it is impossible to derive pair data items.

However, according to a signal processing method of the present embodiment, as shown in FIG. 1A, in a case where the peak signal S2 is extracted from the first range R1$d$ of the DOWN section, but the peak signal S1 is not extracted from the first range R1$u$ of the UP section, the range of the first range R1$u$ of the UP section is widened to a second range R2, whereby the peak signal S1 is extracted. Therefore, the width W2 of the second range R2 of the UP section is larger than the width W1 of the first range R1$u$ (W1<W2).

The radar device pairs the peak signal S1 extracted from the UP section and the peak signal S2 extracted from the DOWN section, thereby deriving pair data items. Also, the radar device generates information on the target T on the basis of the derived pair data items.

As described above, in a case where it is impossible to extract the peak signal S1 of the UP section from the first range R1$u$, the radar device according to the present embodiment extracts the peak signal S1 of the UP section from the second range R2 wider than the first range R1$u$. Therefore, even in a case where the peak signal S1 is out of the first range R1$u$, such as a case where the preceding vehicle which is the target T performs sudden deceleration or the like, it is possible to extract the peak signal S1 with high accuracy. Hereinafter, the radar device which performs the above-described signal processing method will be further described.

Figure 2:
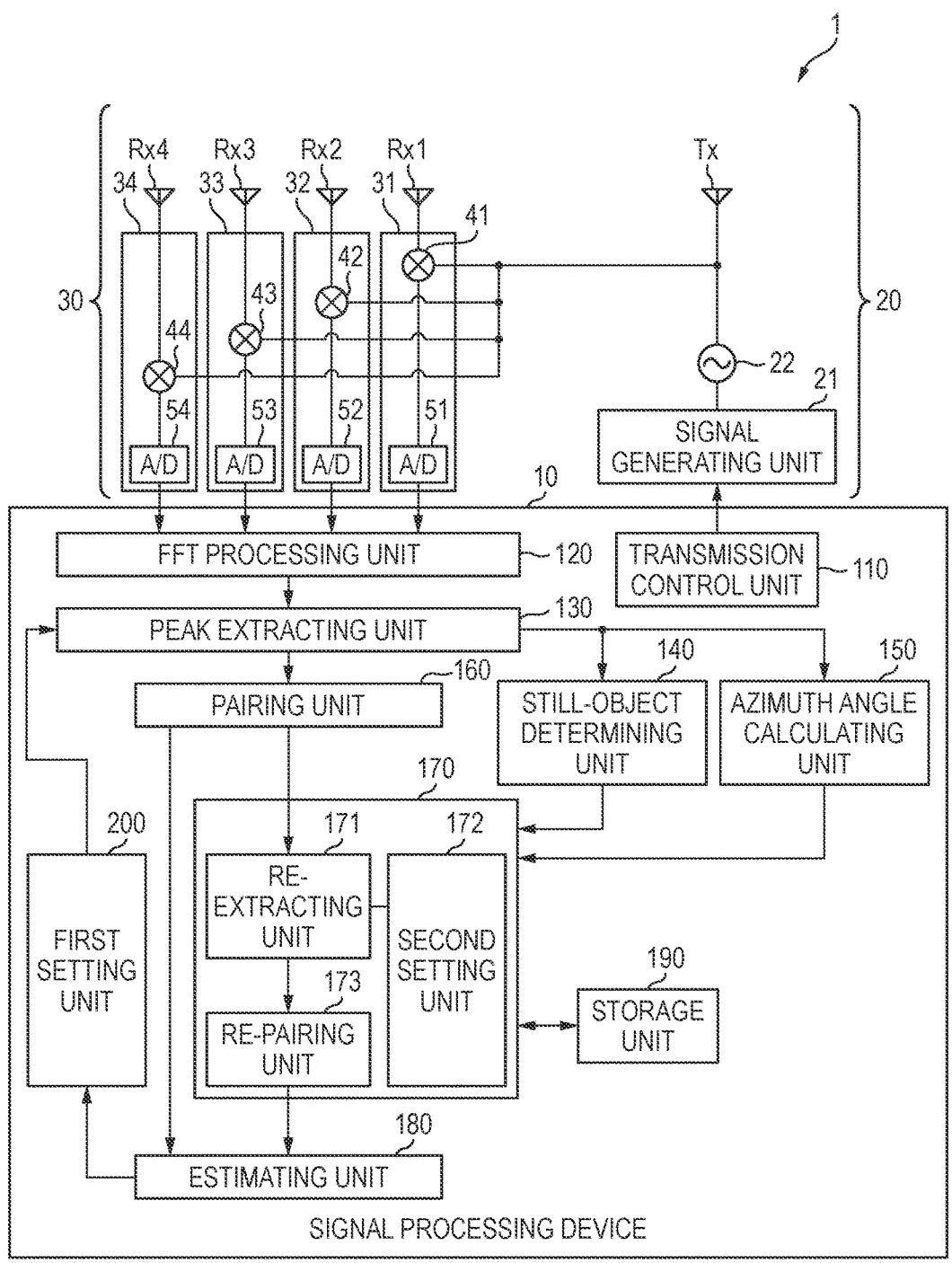
FIG. 2 is a view illustrating a radar device according to the embodiment of the present invention.

FIG. 2 is a view illustrating the radar device 1 according to the embodiment of the present invention. The radar device 1 includes a signal processing device 10, a signal transmitting unit 20, and a signal receiving unit 30.

The signal transmitting unit 20 includes a signal generating unit 21, an oscillator 22, and a transmitting antenna Tx. The signal generating unit 21 generates a modulation signal in a triangular waveform, and supplies the modulation signal to the oscillator 22.

The oscillator 22 generates a transmission signal by performing frequency modulation on a continuous-wave signal on the basis of the modulation signal generated by the signal generating unit 21, and outputs the transmission signal to the transmitting antenna Tx. The transmitting antenna Tx transmits the transmission signal input from the oscillator 22, as a transmission wave, in the traveling direction of the own vehicle C.

The signal receiving unit 30 includes, for example, four receiving antennae Rx1 to Rx4 (hereinafter, collectively referred to as the receiving antennae Rx), and individual signal receiving units 31 to 34 connected to the receiving antennae Rx, respectively. The receiving antennae Rx receives reflected waves of the transmission wave from a target T, as reception signals.

The individual signal receiving units 31 to 34 include mixers 41 to 44 and A/D conversion units 51 to 54, and perform various processes on the reception signals received through the receiving antennae Rx. The mixers 41 to 44 mix the reception signals with the transmission signal input from the oscillator 22, thereby generating beat signals representing frequency differences between the reception signals and the transmission signal. The A/D conversion units 51 to 54 convert the beat signals generated by the mixers 41 to 44 into digital signals, and output the digital signals to the signal processing device 10.

Although the case where the individual signal receiving units 31 to 34 include the mixers 41 to 44 and the A/D conversion units 51 to 54 has been described, the present invention is not limited thereto. For example, the individual signal receiving units 31 to 34 may include amplifiers and filters (not shown in the drawings).

The signal processing device 10 is a micro computer including a central processing unit (CPU), a storage unit 190, and so on, and controls the whole of the radar device 1. The signal processing device 10 includes a transmission control unit 110, an FFT processing unit 120, a peak extracting unit 130, a still-object determining unit 140, an azimuth angle calculating unit 150, a pairing unit 160, a pair re-forming unit 170, an estimating unit 180, and a first setting unit 200, as functions which can be implemented in a software wise by the micro computer.

The transmission control unit 110 controls modulation signal generating timings of the signal generating unit 21 of the signal transmitting unit 20, and so on. The FFT processing unit 120 performs FFT on the beat signals output from the individual signal receiving units 31 to 34, thereby converting the beat signals into frequency beat signals of the frequency domain. The first setting unit 200 sets the first ranges R1$u$ and R1$d$ which are predetermined frequency ranges, on the basis of estimated peak signals estimated by the estimating unit 180.

The peak extracting unit 130 extracts a peak signal of an UP section and a peak signal of a DOWN section in the first ranges R1$u$ and R1$d$ set by the first setting unit 200. Specifically, for example, the peak extracting unit 130 extracts beat signals having signal level values exceeding a predetermined threshold, as peak signals, from the frequency beat signals. Hereinafter, a peak signal of the UP section and a peak signal of the DOWN section will be referred to as the UP peak signal and the DN peak signal.

Also, history peak signals are peak signals extracted from at least one of the first ranges R1$u$ and R1$d$ and the second range R2 which are predetermined frequency ranges as described above, and are peak signals belonging to the same target as that of peak signals of the previous process. A history peak signal of those history peak signals corresponding to the UP section will be referred to as the history UP peak signal, and a history peak signal of them corresponding to the DOWN section will be referred to as the history DN peak signal.

The peak extracting unit 130 extracts an UP peak signal included in the first range R1$u$ of the UP section and a DN peak signal included in the first range R1$d$ of the DOWN section, from the extracted peak signals, and outputs the UP peak signal and the DN peak signal to the pairing unit 160. Also, the peak extracting unit 130 outputs all of the extracted peak signals to the still-object determining unit 140 and the azimuth angle calculating unit 150.

The still-object determining unit 140 calculates the relative velocity of the target T on the basis of the frequency difference between the UP peak signal and the DN peak signal extracted by the peak extracting unit 130. The still-object determining unit 140 determines whether the UP peak signal and the DN peak signal are peak signals corresponding to a still object (hereinafter, referred to as still-object peak signals), on the basis of information on the velocity of the own vehicle C. The still-object determining unit 140 outputs the determination result to the pair re-forming unit 170. Also, the still-object determining unit 140 may acquire the information on the velocity of the own vehicle C from a vehicle velocity sensor (not shown in the drawings) of the own vehicle C.

The azimuth angle calculating unit 150 calculates an azimuth angle on the basis of the peak signals of the UP section and the DOWN section. The azimuth angle calculating unit 150 calculates the azimuth angle, for example, by performing calculation using ESPRIT (Estimation of Signal Parameters via Rotational Invariance Techniques). The azimuth angle calculating unit 150 outputs the calculated azimuth angle to the pair re-forming unit 170.

The pairing unit 160 performs a pairing process of pairing the UP peak signals and the DN peak signals. The pairing unit 160 performs a pairing process on the history UP peak signals and the history DN peak signals extracted by the peak extracting unit 130. The pairing unit 160 outputs the pairs of history UP peak signals and history DN peak signals (hereinafter, referred to as the pairs of data items) to the estimating unit 180. Also, the pairing unit 160 outputs unpaired signals of the history DN peak signals to the pair re-forming unit 170.

In a case where there is any unpaired history DN peak signal after the pairing of the pairing unit 160, the pair re-forming unit 170 re-extracts peak signals of the UP section, and performs a pairing process. The pair re-forming unit 170 includes a re-extracting unit 171, a second setting unit 172, and a re-pairing unit 173.

First, the reason why the pair re-forming unit 170 re-extracts peak signals of the UP section will be described. First, frequency beat signals fB generated by the individual signal receiving units 31 to 34 can be expressed as fB=fR±fV using a distance frequency fR proportional to the distance between the own vehicle C and the target T and a velocity frequency fV proportional to the relative velocity between the own vehicle C and the target T.

Therefore, beat signals fup of the UP section and beat signals fdn of the DOWN section can be expressed as fup=fR−fV and fdn=fR+fV, respectively.

Now, a case where a preceding vehicle suddenly decelerates, for example, by slamming on the brakes when the own vehicle C runs at the same velocity as that of the preceding vehicle is considered on the basis of the principle of the process of detecting a target by the FMCW system. In this case, the distance from the target T significantly decreases, and the relative velocity significantly increases. Here, it is assumed that the distance frequency fR decreases by A, and the velocity frequency fV increases by B.

In this case, beat signals fup2 of the UP section after the sudden deceleration become fup2=fR−A (fV+B)=fR−fV−A−B, and vary from the beat signals fup before the sudden deceleration by −A−B. Meanwhile, beat signals fdn2 of the DOWN section after the sudden deceleration become fdn2=fR−A+(fV+B)=fR−fV−A+B, and vary from the beat signals fdn before the sudden deceleration by −A+B. From this, it can be seen that, for example, in a case where a preceding vehicle suddenly decelerates, beat signals of the UP section vary more significantly. Similarly, in some other cases such as a case where the own vehicle C suddenly decelerates by slamming on the brakes, or a case where a preceding vehicle suddenly accelerates, beat signals of the UP section vary more significantly.

As described above, in a case where a preceding vehicle suddenly decelerates, beat signals of the UP section vary more significantly than beat signals of the DOWN section do. Therefore, UP peak signals are more likely than DN peak signals to vary, and are likely to be at frequencies which are out of the first range R1$u$ but are close to the first range R1$u$ even in a case where they are out of the first range R1$u$. In other words, even if the peak extracting unit 130 can extract history DN peak signals, history UP peak signals are not extracted, and unpaired history DN peak signals after the pairing of the pairing unit 160 are likely to occur. For this reason, in a case where history DN peak signals are extracted but history UP peak signals are not extracted, the radar device 1 according to the embodiment sets a second range R2 by widening the range of the first range R1$u$ of the UP section.

In other words, if a preceding vehicle suddenly accelerates or decelerates, a situation in which history DN peak signals are extracted from the DOWN section but history UP peak signals are not extracted from the UP section occurs. In this case, at frequencies which are not included in the first range R1$u$ but are close to the first range R1$u$, history UP peak signals exist.

For this reason, if the second range R2 is set by widening the first range R1$u$, it is possible to extract history UP peak signals with high accuracy. In other words, it is possible to prevent peak signals different from original history UP peak signals from being erroneously extracted. As described above, the pair re-forming unit 170 according to the present embodiment re-extracts peak signals of the UP section, and re-performs pairing of the unpaired history DN peak signals.

Figure 3A:
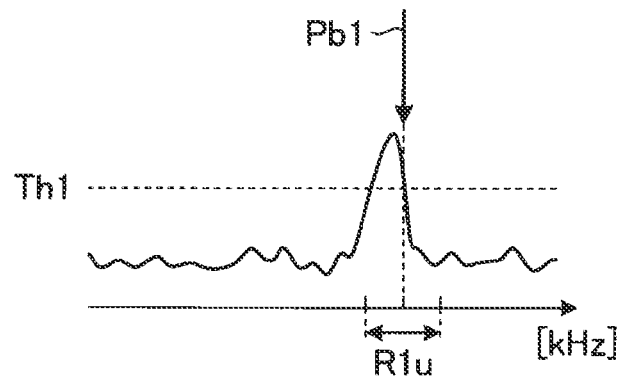
FIG. 3A is a view for explaining an UP peak signal extracting process which is performed by a peak extracting unit.
Figure 3B:
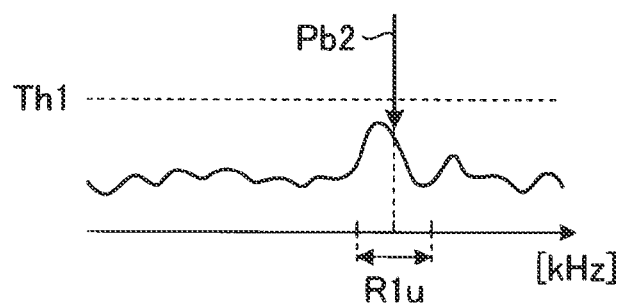
FIG. 3B is a view for explaining the UP peak signal extracting process which is performed by the peak extracting unit.
Figure 3C:
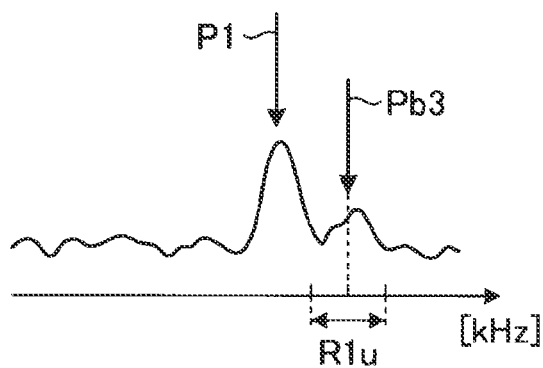
FIG. 3C is a view for explaining the UP peak signal extracting process which is performed by the peak extracting unit.

Also, a case where a UP peak signal is out of the first range R1u is not limited to the above-described case where the preceding vehicle suddenly accelerates or decelerates. For example, if the signal level of a beat signal decreases, an UP peak signal may be deviated from the first range R1u. This case will be described with reference to FIGS. 3A to 3C. FIGS. 3A to 3C are views for explaining an UP peak signal extracting process of the peak extracting unit 130.

As shown in FIG. 3A, the peak extracting unit 130 compares the signal level of the frequency beat signal with a predetermined threshold Th1, thereby extracting a history UP peak signal in the first range R1u including an estimated peak signal Pb1. Also, on the basis of the history UP peak signal extracted by the peak extracting unit 130, the estimating unit 180 estimates the next estimated peak signal Pb2.

However, as shown in FIG. 3B, in a case where the signal level of the UP peak signal becomes equal to or lower than the predetermined threshold Th1 for a certain reason such as influence of noise, the peak extracting unit 130 cannot extract any history UP peak signal. In this case, the radar device 1 derives information on the target T, using the estimated peak signal Pb2, thereby performing a process of securing continuity of derivation results of the target T, that is, a so-called extrapolating process. In this case, on the basis of the estimated peak signal Pb2, the estimating unit 180 estimates the next estimated peak signal Pb3.

As described above, if the estimating unit 180 estimates the next estimated peak signal Pb3 on the basis of the estimated peak signal Pb2, the accuracy decreases as compared to estimation using an actual history UP peak signal. For this reason, a history UP peak signal P1 may be deviated from the first range R1u including the estimated peak signal Pb3 as shown in FIG. 3C.

As described above, in the case where the preceding vehicle suddenly decelerates, the position of a peak shifts, and, for example, the level of the peak is low. Therefore, if an extrapolating process is performed without performing peak extraction, a history UP peak signal may be deviated from the first range R1u. Even in this case, the pair re-forming unit 170 re-extracts a peak signal of the UP section, and re-performs pairing of the unpaired history DN peak signal.

Referring to FIG. 2 again, the re-extracting unit 171 of the pair re-forming unit 170 extracts an UP section peak signal of the second range R2 set by the second setting unit 172. The re-extracting unit 171 extracts, for example, a beat signal exceeding the predetermined threshold, as an UP peak signal (hereinafter, referred to as the re-extracted UP peak signal), in the second range R2. Alternatively, the peak extracting unit 130 may extract a signal which is one of the UP peak signals extracted by the peak extracting unit 130 and is included in the second range R2, as a re-extracted UP peak signal. The re-extracting unit 171 outputs the re-extracted UP peak signal to the re-pairing unit 173.

In a case where a history DN peak signal can be extracted but a history UP peak signal cannot be extracted, and thus the history DN peak signal remains as an unpaired signal, the second setting unit 172 sets the second range R2 to be wider than the first range R1u. The second setting unit 172 outputs the set second range R2 to the re-extracting unit 171.

For example, it is assumed that the first range R1u is a range corresponding to six BINs having the frequency of the estimated peak signal as the center (three BINs on each side of the low frequency side and the high frequency side). In this case, the second setting unit 172 sets, for example, a wider range corresponding to twelve BINs having the frequency of the estimated peak signal as the center (six BINs on each side of the low frequency side and the high frequency side), as the second range R2. Also, one BIN is about 468 Hz.

In this case, it becomes possible for the re-extracting unit 171 to extract an UP peak signal which could not be extracted by the peak extracting unit 130, and thus it is possible to improve the accuracy of peak extraction.

Also, the second range R2 which is set by the second setting unit 172 is not limited thereto. For example, the second setting unit 172 may set the second range R2 on the basis of variation in the relative velocity between the own vehicle C and the target T. For example, in a case where the target T suddenly decelerates, whereby the relative velocity between the target and the own vehicle C increases, the distance between the own vehicle C and the target T decreases, and the history UP peak signal shifts to the low frequency side. For this reason, in the case where the relative velocity increases, the second setting unit 172 sets a range in which the width of the low frequency side is wider than the width of the high frequency side, as the second range R2. Specifically, the second setting unit 172 sets, for example, a range in which the width of the low frequency side from the frequency of the estimated peak signal is five BINs and the width of the high frequency side from the frequency of the estimated peak signal is one BIN, as the second range R2.

In other words, the width of the second range R2 is the same width (the width of six BINs) as the width W1 of the first range R1u, and in the first range R1u, with reference to the frequency of the estimated peak signal, the low frequency side and the high frequency side have the same width (corresponding to three BINs); whereas in the second range R2, as described above, with reference to the frequency of the estimated peak signal, the width of the high frequency side is wider than the width of the low frequency side.

As described above, even in the case where any peak signal is not extracted from the first range R1u of the UP section, it is possible to extract a history UP peak signal existing at a frequency which is out of the first range R1u but is close to the first range R1u, with high accuracy. Also, if one side of the low frequency side and the high frequency side is widened and the other side is narrowed as compared to the original first range R1u on the basis of the operation state (distance and relative velocity) of the target, without changing the width of the entire range, it is possible to surely prevent a peak signal different from the original history UP peak signal from being extracted.

Alternatively, in the case where the relative velocity decreases, the second setting unit 172 sets a range in which the width of the low frequency side is narrower than the width of the high frequency side, as the second range R2. Specifically, the second setting unit 172 sets, for example, a range in which the width of the low frequency side from the frequency of the estimated peak signal is one BIN and the width of the high frequency side is five BINs, as the second range R2.

In the present embodiment, when the second setting unit 172 sets the second range R2 on the basis of the relative velocity, it sets the second range R2 such that that second range has the same width as the width of the first range R1. However, the present invention is not limited thereto. For example, in a case where the relative velocity is larger than a predetermined value, the second setting unit 172 may set the second range R2 such that the second range is wider than the first range R1u.

The re-pairing unit 173 pairs the re-extracted UP peak signal extracted by the re-extracting unit 171 and the history DN peak signal extracted by the peak extracting unit 130. The re-pairing unit 173 performs the pairing, for example, under a first condition related to whether the re-extracted UP peak signal has been already paired by the pairing unit 160. For example, in a case where the re-extracted UP peak signal has been already paired by the pairing unit 160, and a history DN peak signal corresponding thereto exists, the re-pairing unit 173 does not perform re-pairing.

Also, the re-pairing unit 173 performs pairing, for example, under a second condition related to whether the UP peak signal of the second range R2 corresponds to a still object. In a case where the UP peak signal of the second range R2 corresponds to a still object, that is, in a case where the re-extracted UP peak signal extracted by the re-extracting unit 171 corresponds to a still object, the re-pairing unit 173 does not re-pair the corresponding re-extracted UP peak signal and the history DN peak signal.

Also, for example, under a third condition related to whether the difference in the left-right direction of the own vehicle C between a target T1 corresponding to the re-extracted UP peak signal and a target T2 corresponding to the history DN peak signal is equal to or smaller than a predetermined value, or not, the re-pairing unit 173 performs pairing. In a case where the difference in the left-right direction of the own vehicle C between the target T1 corresponding to the re-extracted UP peak signal and the target T2 corresponding to the history DN peak signal is equal to or smaller than the predetermined value, the re-pairing unit 173 performs pairing.

For example, the predetermined value may be, for example, 1.8 m corresponding to the width of the vehicle. In a case where the distance between the target T1 and the target T2 is equal to or larger than the width of the vehicle, the target T1 and the target T2 are likely to correspond to different targets, like a preceding vehicle and a vehicle running in a lane adjacent to the preceding vehicle. Therefore, in the case where the difference in the left-right direction of the own vehicle C is larger than the predetermined value, the re-pairing unit 173 does not perform re-pairing, whereby erroneous pairing of the adjacent vehicle and the preceding vehicle are prevented.

Figure 4:
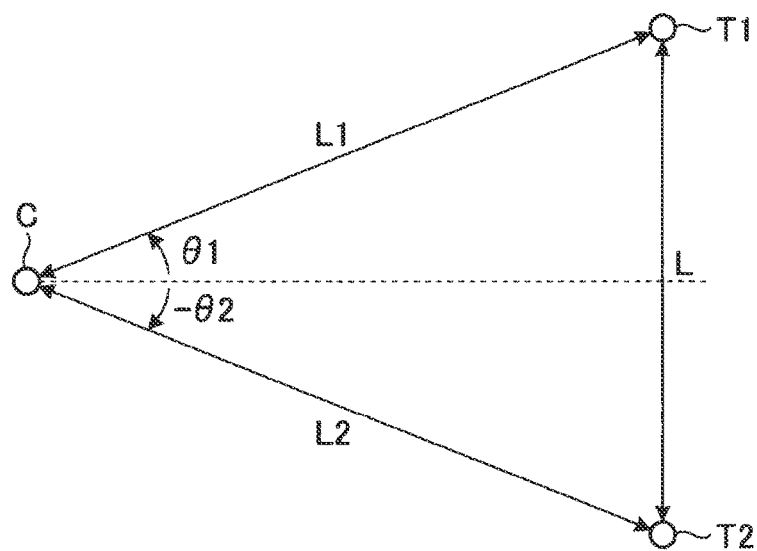
FIG. 4 is a view for explaining the correspondence relation between targets and azimuth angles.

As shown in FIG. 4, the difference between the target T1 and the target T2 in the left-right direction can be calculated on the basis of the azimuth angle of the re-extracted UP peak signal and the azimuth angle of the history DN peak signal. Therefore, the re-pairing unit 173 performs pairing of the re-extracted UP peak signal and the history DN peak signal according to those azimuth angles. Specifically, for example, a case where the azimuth angle of the re-extracted UP peak signal is θ1, and the azimuth angle of the history DN peak signal is −θ2, and the distance from the own vehicle C to the target T1 is L1, and the distance from the own vehicle C to the target T2 is L2 is considered. In this case, the re-pairing unit 173 calculates the difference L as L1 sin θ1+L2 sin θ2. If the calculated difference L is equal to or smaller than the predetermined value, the re-pairing unit performs pairing.

As described above, the re-pairing unit 173 performs re-pairing in a case where the first to third conditions are satisfied, whereby erroneous pairing of peak signals corresponding to different targets, that is, mispairing can be suppressed. Since the re-extracting unit 171 extracts the re-extracted UP peak signal, for example, in the second range R2 wider than the first range R1$u$, it becomes easy to erroneously detect, for example, peak signals corresponding to different targets. For this reason, the re-pairing unit 173 performs re-pairing under the conditions, whereby mispairing is suppressed. Therefore, it is possible to improve the accuracy of pairing of the radar device 1, and it is possible to improve the accuracy of detection of the target T. Also, FIG. 4 is a view for explaining the correspondence relation between the targets T1 and T2 and the azimuth angles θ1 and θ2.

Referring to FIG. 2 again, the estimating unit 180 estimates current history peak signals on the basis of the previous history peak signals. Specifically, the estimating unit 180 generates an estimated peak signal on the basis of the history UP peak signal and the history DN peak signal paired by the pairing unit 160. Also, the estimating unit 180 generates an estimated peak signal on the basis of the re-extracted UP peak signal and the history DN peak signal repaired by the re-pairing unit 173. The estimating unit 180 outputs the estimated peak signals to the first setting unit 200.

The storage unit 190 stores information used in the processes of the individual units of the signal processing device 10, such as the first and second ranges R1$u$, R1$d$, and R2, and stores the results of the processes of the individual units. The storage unit 190 is, for example, an erasable programmable read only memory (EPROM), a flash memory, or the like.

Figure 5:
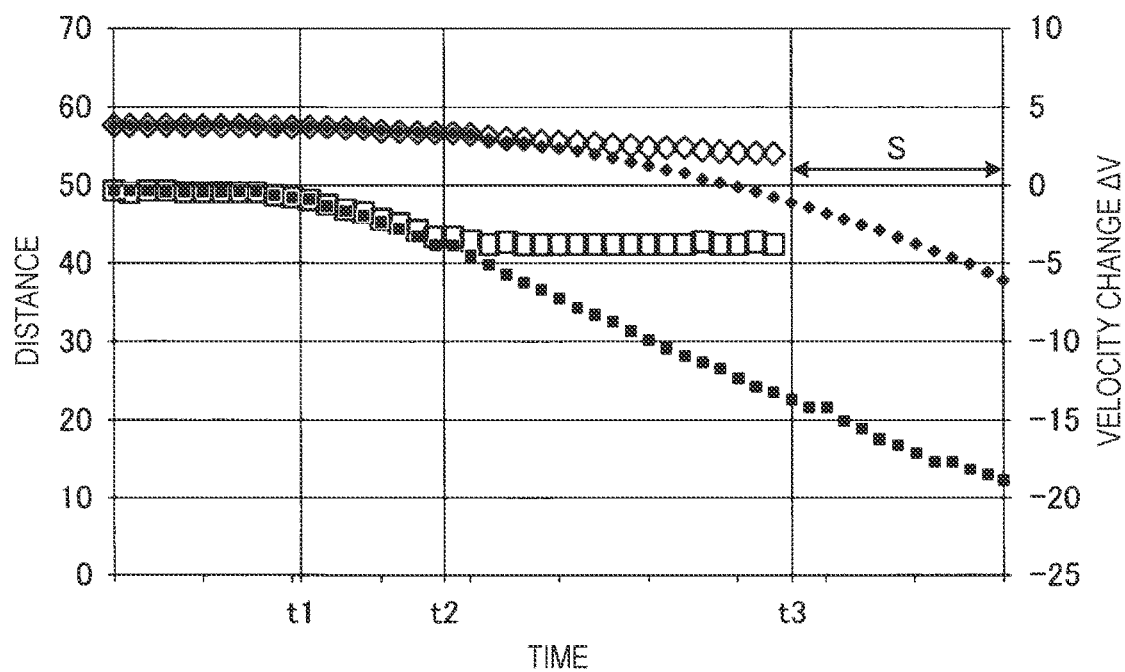
FIG. 5 is a view for explaining the effect of the radar device according to the embodiment of the present invention.

Now, results of detection on the target T in a case where re-pairing is performed using the second range R2 and a case where re-pairing is not performed will be described. FIG. 5 is a view for explaining the effect of the radar device 1 according to the present embodiment. Here, a case where the own vehicle C follows a preceding vehicle at the same velocity as that of the preceding vehicle will be described.

In a graph shown in FIG. 5, the left vertical axis represents the distance from the own vehicle C to the target which is the preceding vehicle, and the right vertical axis represents change in the vehicle velocity of the preceding vehicle. In other words, the right vertical axis represents a velocity change ΔV in a case where the velocity of the preceding vehicle changes to V+ΔV when the preceding vehicle and the own vehicle C run at a velocity V. Therefore, as ΔV increases, the relative velocity decreases. Also, the horizontal axis represents time.

In FIG. 5, white rhomboids represent distances from the preceding vehicle which are detected by the radar device 1 in the case where re-pairing is not performed. Also, white squares represent velocity changes ΔV which are detected by the radar device 1 in the case where re-pairing is not performed. Black rhomboids represent distances from the preceding vehicle which are detected by the radar device 1 in the case where re-pairing is performed. Also, black squares represent velocity changes ΔV which are detected by the radar device 1 in the case where re-pairing is performed.

As shown by the white squares in FIG. 5, in the case where re-pairing is not performed, at a time point t1, the preceding vehicle decelerates, whereby the velocity change ΔV decreases. However, after a time point t2, the velocity change ΔV rarely changes, and at a time point t3, the velocity change ΔV becomes undetectable. Also, as shown by the white rhomboids, the distance from the preceding vehicle slightly decreases, but is substantially constant, and after the time point t3, the corresponding distance becomes undetectable. As described above, if the radar device 1 does not perform re-pairing, it is impossible to cope with change in a case where the preceding vehicle suddenly accelerates or decelerates, and the preceding vehicle is missed.

Meanwhile, in the case where re-pairing is performed, as shown by the black squares, even if the velocity of the preceding vehicle decreases at the time point t1, the radar device 1 can detect the velocity change ΔV decreasing after the time point t2, and it is possible to continuously detect the velocity change ΔV even after the time point t3. Also, it is possible to continuously detect the distance from the preceding vehicle after the time point t3.

As described above, according to the radar device 1 of the present embodiment, since re-pairing is performed, for example, even in a case where it is impossible to extract any history UP peak signal due to deceleration of the preceding vehicle, as shown in a section S, it is possible to detect the distance and the velocity without missing the preceding vehicle. Also, in the case where it is impossible to extract any history UP peak signal, an extrapolating process is performed. Therefore, as shown in FIG. 5, if re-pairing is not performed, even in a period from the time point t2 to the time point t3 when the preceding vehicle is not missed, it is impossible to accurately detect the distance and velocity of the preceding vehicle. Meanwhile, if the radar device 1 performs re-pairing, even in the period from the time point t2 to the time point t3, it is possible to more accurately detect the distance and velocity of the preceding vehicle.

Figure 6:
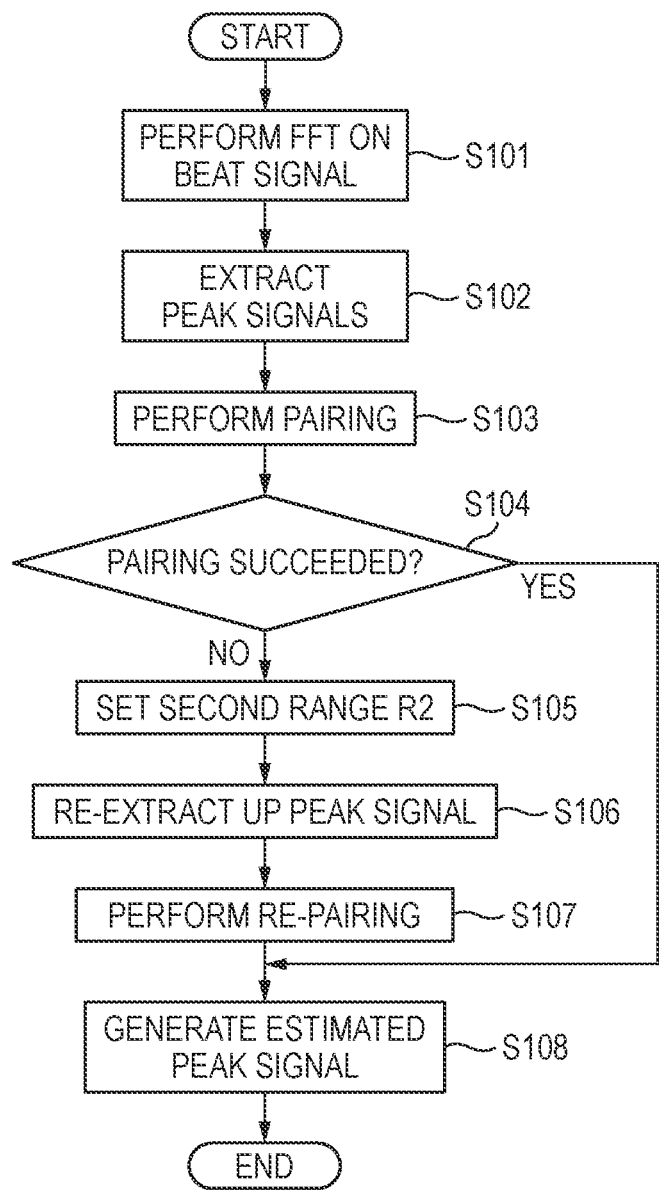
FIG. 6 is a flow chart illustrating the processing procedure of signal processing which is performed by the radar device according to the embodiment of the present invention.

Now, the processing procedure of signal processing which is performed by the radar device 1 according to the embodiment will be described with reference to FIG. 6. FIG. 6 is a flow chart illustrating the processing procedure of the signal processing which is performed by the radar device 1 according to the embodiment.

As shown in FIG. 6, in STEP S101, the radar device 1 performs FFT on the beat signals which are difference signals between the transmission signal and the reception signals received through the receiving antennae Rx. Subsequently, in STEP S102, the radar device 1 extracts peak signals from the beat signals subjected to FFT.

In STEP S103, the radar device 1 performs pairing of history UP peak signals and history DN peak signals of the extracted peak signals. In STEP S104, the radar device 1 determines whether the pairing of STEP S103 has succeeded. In a case where the pairing has succeeded ("Yes" in STEP S104), the radar device proceeds to STEP S108.

Meanwhile, in a case where history DN peak signals were extracted but any history UP peak signal could not be extracted, and thus the pairing has failed ("No" in STEP S104), in STEP S105, the radar device 1 sets the second range R2 as a peak signals re-extracting range. In STEP S106, the radar device 1 re-extracts UP peak signals in the set second range R2.

In STEP S107, the radar device 1 performs re-pairing of the re-extracted UP peak signals re-extracted in STEP S106 and the history DN peak signals. Then, the radar device 1 generates the next estimated peak signals on the basis of the pairing result in STEP S108, and finishes the processing.

As described above, if the radar device 1 according to the embodiment cannot extract any history UP peak signal in the first range R1u, it extracts re-extracted UP peak signals in the second range R2 different from the first range R1u. The radar device 1 performs re-pairing of the re-extracted UP peak signals and the history DN peak signals. Therefore, the radar device 1 can extract peak signals with high accuracy.

As described above, the radar device 1 according to the present embodiment includes the peak extracting unit (an extracting unit) 130, the estimating unit 180, the first setting unit 200, the second setting unit 172, and the re-extracting unit 171. The peak extracting unit 130 extracts peak signals, from the transmission signal in which a frequency thereof varies in the predetermined cycle and the reception signals obtained by receiving reflected waves of the transmission wave based on the transmission signal from the target T, in the first ranges R1u and R1d included in the first period (the UP section) in which the frequency of the transmission signal increases and the second period (the DOWN section) in which the frequency decreases. The estimating unit 180 estimates the current peak signals on the basis of the previous peak signals extracted by the peak extracting unit 130. The first setting unit 200 sets the first ranges R1u and R1d on the basis of the estimation result of the estimating unit 180. In a case where peak signals are extracted in the first range R1d of the second period, but any peak signal cannot be extracted in the first range R1u of the first period, the second setting unit 172 sets the second range R2 different from the first range R1u. The re-extracting unit 171 extracts peak signals of the first period in the second range R2 set by the second setting unit 172.

Therefore, even in a case where peak signals are deviated from the first range R1u, for example, even in a case where the preceding vehicle which is the target T performs sudden deceleration or the like, the radar device 1 can extract history peak signals with high accuracy.

Also, the second setting unit 172 of the radar device 1 according to the above-described embodiment sets the second range R2 to be wider than the first range R1u.

Therefore, it becomes possible for the radar device 1 to extract history peak signals which could not be extracted in the first range R1u. Therefore, it is possible to extract history peak signals with high accuracy.

Also, the second setting unit 172 of the radar device 1 according to the above-described embodiment sets the second range R2 according to change in the relative velocity.

Therefore, it becomes possible for the radar device 1 to extract history peak signals which could not be extracted in the first range R1u, according to the relative velocity. Therefore, it is possible to extract history peak signals with high accuracy.

Also, in a case where the relative velocity increases, the second setting unit 172 of the radar device 1 according to the above-described embodiment sets the second range R2 in which the width of the low frequency side from the current peak signal estimated by the estimating unit 180 is wider than the width of the high frequency side.

Therefore, it becomes possible for the radar device 1 to extract history peak signals which could not be extracted in the first range R1u, according to the relative velocity. Therefore, it is possible to efficiently extract history peak signals.

Also, in a case where the relative velocity decreases, the second setting unit 172 of the radar device 1 according to the above-described embodiment sets the second range R2 in which the width of the high frequency side from the current peak signal estimated by the estimating unit 180 is wider than the width of the low frequency side.

Therefore, it becomes possible for the radar device 1 to extract history peak signals which could not be extracted in the first range R1u, according to the relative velocity. Therefore, it is possible to efficiently extract history peak signals.

Also, the radar device 1 according to the above-described embodiment further includes the pairing unit 160 which pairs the peak signals of the second period and the peak signals of the first period extracted by the peak extracting unit 130, and the re-pairing unit 173 which pairs the peak signals of the second period and the peak signals of the first period extracted by the re-extracting unit 171.

Therefore, the radar device 1 can perform pairing of the re-extracted peak signals, and can improve the accuracy of pairing, and can improve the accuracy of generation of information on the target T.

Also, in a case where the peak extracting unit 130 extracts peak signals in the first range R1 of the second period, the re-pairing unit 173 of the radar device 1 according to the above-described embodiment pairs the corresponding peak signals and the peak signals of the first period extracted by the re-extracting unit 171.

Therefore, the radar device 1 can suppress mispairing during re-pairing, and can improve the accuracy of pairing.

Also, in a case where the peak signals of the first period extracted by the re-extracting unit 171 do not correspond to a still object, the re-pairing unit 173 of the radar device 1 according to the above-described embodiment performs pairing of the corresponding peak signals and the peak signals of the second period.

Therefore, the radar device 1 can suppress mispairing during re-pairing, and can improve the accuracy of pairing.

Also, the re-pairing unit 173 of the radar device 1 according to the above-described embodiment performs pairing on the basis of an azimuth angle corresponding to the peak signal of the first period extracted by the re-pairing unit 173 and an azimuth angle corresponding to the peak signal of the second period extracted by the extracting unit 130.

Therefore, the radar device 1 can suppress mispairing during re-pairing, and can improve the accuracy of pairing.

Also, in the above-described embodiment, on the assumption that the number of peak signals existing in at least one range of the first ranges R1$u$ and R1$d$ and the second range R2 is one, the case of extracting one peak in the corresponding range has been described. In contrast, in a case where there is a plurality of peak signals in any one range, a peak signal having a frequency closest to the frequency of an estimated peak signal is extracted.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising:
a processor configured to:
   extract peak signals from a frequency difference between a transmission signal in which a frequency varies in a predetermined cycle and a reception signal obtained by receiving a reflected wave of a transmission wave based on the transmission signal from a target, in a first frequency range of each of a first period in which the frequency of the transmission signal increases and a second period in which the frequency decreases;
   estimate a current peak signal on the basis of a previous peak signal extracted by the processor;
   set the first frequency range on the basis of the estimation result of the processor;
   set a second frequency range different from the first frequency range, if the peak signal is extracted in the first frequency range of the second period and the peak signal cannot be extracted in the first frequency range of the first period, the second frequency range being set according to a change in a relative velocity; and
   extract the peak signal in the second frequency range of the first period, set by the processor.

2. The radar device according to claim 1, wherein the processor sets the second frequency range to be wider than the first frequency range.

3. The radar device according to claim 1, wherein in a case where the relative velocity increases, the processor sets the second frequency range in which a width of a low frequency side from the current peak signal estimated by the processor is wider than a width of a high frequency side from the current peak signal.

4. The radar device according to claim 1, wherein in a case where the relative velocity decreases, the processor sets the second frequency range in which a width of a high frequency side from the current peak signal estimated by the processor is wider than a width of a low frequency side from the current peak signal.

5. The radar device according to claim 1, wherein the processor is further configured to:
   pair the peak signal of the second period and the peak signal of the first period extracted by the processor; and
   pair the peak signal of the second period and the peak signal of the first period extracted by the processor.

6. The radar device according to claim 5, wherein in a case where the processor extracts the peak signal in the first frequency range of the second period, the processor pairs the peak signal in the first frequency range of the second period and the peak signal of the first period extracted by the processor.

7. The radar device according to claim 5, wherein in a case where the peak signal of the first period extracted by the processor does not correspond to a still object, the processor performs pairing of the peak signal of the first period and the peak signal of the second period.

8. The radar device according to claim 5, wherein the processor performs pairing on the basis of an azimuth angle corresponding to the peak signal of the first period extracted by the processor and an azimuth angle corresponding to the peak signal of the second period extracted by the processor.

9. A signal processing method comprising:
an extracting process of extracting peak signals from a frequency difference between a transmission signal in which frequency varies in a predetermined cycle and a reception signal obtained by receiving a reflected wave of a transmission wave based on the transmission signal from a target, in a first frequency range of each of a first period in which the frequency of the transmission signal increases and a second period in which the frequency decreases;
an estimating process of estimating a current peak signal on the basis of a previous peak signal extracted by the extracting process;
a first setting process of setting the first frequency range on the basis of the estimation result of the estimating process;
a second setting process of setting a second frequency range different from the first frequency range, if the peak signal is extracted in the first frequency range of the second period and the peak signal cannot be extracted in the first frequency range of the first period, the second frequency range being set according to a change in a relative velocity; and
a re-extracting process of extracting the peak signal in the second frequency range of the first period set by the second setting process.

* * * * *